United States Patent [19]
Poetsch et al.

[11] Patent Number: 6,146,719
[45] Date of Patent: Nov. 14, 2000

[54] LIQUID-CRYSTALLINE COMPOUNDS, AND LIQUID-CRYSTALLINE MEDIUM

[75] Inventors: Eike Poetsch, Mühltal; Brigitte Schuler, Grossostheim; Michael Heckmeier, Mühltal; Volker Reiffenrath, Rossdorf; Werner Binder; Joachim Krause, both of Dieburg, all of Germany

[73] Assignee: Merck Patent Gesellschatf mit beschrankter Haftung, Germany

[21] Appl. No.: 09/407,940

[22] Filed: Sep. 25, 1999

[30] Foreign Application Priority Data

Sep. 29, 1998 [DE] Germany ............... 198 44 498

[51] Int. Cl.[7] .................. C09K 19/34; C09K 19/32; C09K 19/30; C09K 19/52

[52] U.S. Cl. ........... 428/1.1; 252/299.01; 252/299.61; 252/299.62; 252/299.63; 252/299.67

[58] Field of Search .............. 252/299.61, 299.63, 252/299.01, 299.67, 299.62; 428/1.1

Primary Examiner—Shean C. Wu
Attorney, Agent, or Firm—Millen, White, Zelano & Branigan, P.C.

[57] ABSTRACT

A liquid-crystalline medium based on a mixture of polar compounds of positive dielectric anisotropy, including one or more compounds of the general formula I:

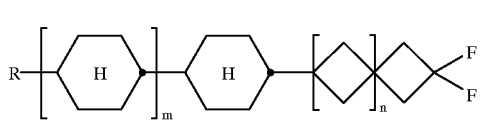

in which,

R is H, an alkyl or alkenyl radical having 1 or 2 to 15 carbon atoms respectively which is unsubstituted, monosubstituted by CN or $_{CF.}$ or at least monosubstituted by halogen, where one or more $CH_2$ groups in these radicals may also, in each case independently of one another, be replaced by —O—, —S—,

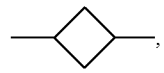

—CO—, —CO—O—, —O—CO—, or —O—CO—O— in such a way that O atoms are not linked directly to one another, m is 0 or 1, n is 0, 1 or 2, and m+n is 1, 2 or 3.

20 Claims, No Drawings

LIQUID-CRYSTALLINE COMPOUNDS, AND LIQUID-CRYSTALLINE MEDIUM

The present invention relates to a liquid-crystalline medium, and to the use thereof for electro-optical purposes, and to displays containing this medium.

Liquid-crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, in the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, must satisfy various requirements depending on the cell type and area of application. For example, materials for cells having a twisted nematic structure should have positive dielectric anisotropy and low electrical conductivity.

For example, media having large positive dielectric anisotropy, broad nematic phases, relatively low birefringence, very high specific resistance, good UV and temperature stability and low vapour pressure are desired for matrix liquid-crystal displays containing integrated non-linear elements for switching individual pixels (MLC displays).

Matrix liquid-crystal displays of this type are known. Non-linear elements which can be used for individual switching of the individual pixels are, for example, active elements (i.e. transistors). Reference is then made to an "active matrix", where a distinction can be made between two types:

1. MOS (metal oxide semiconductor) or other diodes on a silicon wafer as substrate.
2. Thin-film transistors (TFTs) on a glass plate as substrate.

The use of monocrystalline silicon as substrate material restricts the display size, since even modular assembly of various part-displays results in problems at the joints.

In the case of more-promising type 2, which is preferred, the electro-optical effect used is usually the TN effect. A distinction is made between two technologies: TFTs comprising compound semiconductors, such as, for example, CdSe or TFTs based on polycrystalline or amorphous silicon. The latter technology is being worked on intensively worldwide.

The TFT matrix is applied to the inside of one glass plate of the display, while the other glass plate carries the transparent counterelectrode on its inside. In contrast to the size of the pixel electrode, the TFT is very small and has virtually no interfering effect on the image. This technology can also be expanded to fully colour-compatible displays, in which a mosaic of red, green and blue filters is arranged in such a way that a filter element is opposite each switchable pixel.

The TFT displays usually operate as TN cells with crossed polarizers in transmission and are illuminated from the back.

The term MLC displays here covers any matrix display containing integrated non-linear elements, i.e., besides the active matrix, also displays containing passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to the insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SCHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of a MLC display worsens, and the problem of after-image elimination can occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures of the prior art are also particularly disadvantageous. The demands are that no crystallization and/or smectic phases occur, even at low temperatures, and the temperature dependence of the viscosity is as low as possible. The MLC displays from the prior art thus do not meet todays requirements.

Besides liquid-crystal displays which use back illumination, i.e. are operative transmissively and optionally transflectively, there is also particular interest in reflective liquid-crystal displays. These reflective liquid-crystal displays use the ambient light for information display. They thus consume significantly less energy than back-illuminated liquid-crystal displays of corresponding size and resolution. Since the TN effect is characterized by very good contrast, reflective displays of this type are readily legible even under bright ambient conditions. This is already known of simple reflective TN displays, as used, for example, in wristwatches and pocket calculators. However, the principle can also be applied to high-quality, higher-resolution active matrix-addressed displays, such as, for example, TFT displays. Here, as is already the case in the generally conventional transmissive TFT-TN displays, the use of liquid crystals of low birefringence ($\Delta n$) is necessary in order to achieve low optical retardation ($d \cdot \Delta n$). This low optical retardation results in a low viewing-angle dependence of the contrast, which is usually acceptable (cf. DE 30 22 818). In reflective displays, the use of liquid crystals of low birefringence is much more important than in transmissive displays, since in reflective displays, the effective layer thickness, through which the light passes, is approximately twice as large as in transmissive displays of the same layer thickness.

Besides the lower power consumption (no back-illumination necessary), other advantages of reflective displays over transmissive displays are the space saving, which results in a very low installation depth, and the reduction in problems caused by temperature gradients due to various heating by the back-illumination.

A lower birefringence allows liquid-crystal cells of larger layer thickness to be used, which in turn improves the production yield.

There thus continues to be a great demand for MLC displays, in particular reflective MLC displays, of very high specific resistance at the same time as a large working-temperature range, short response times even at low temperatures and low threshold voltage which do not have these disadvantages, or only do so to a reduced extent.

In TN (Schadt-Helfrich) cells, media are desired which facilitate the following advantages in the cells:
  expanded nematic phase range (in particular down to low temperatures)
  rapid switching at low temperatures
  increased resistance to UV radiation (longer life)
  lower threshold (addressing) voltage
  low birefringence, especially for improved viewing-angle range.

The media available from the prior art do not allow these advantages to be achieved while simultaneously achieving the other parameters.

In the case of supertwisted (STN) cells, media are desired which enable greater multiplexability and/or lower threshold voltages and/or broader nematic phase ranges (in particular at low temperatures). To this end, a further increase in the available parameter latitude (clearing point, smectic-nematic transition or melting point, viscosity, dielectric parameters, elastic parameters) is urgently desired.

The invention has the object of providing media, in particular for these MLC, TN or STN displays, in particular for reflective MLC displays, which do not have the above-mentioned disadvantages or only do so to a reduced extent, and preferably simultaneously have very high specific resistance values and low threshold voltages and low birefringence values.

It has now been found that this object can be achieved if media according to the invention are used in displays.

The invention thus relates to a liquid-crystalline medium based on a mixture of polar compounds of positive dielectric anisotropy, characterized in that it comprises one or more compounds of general formula I:

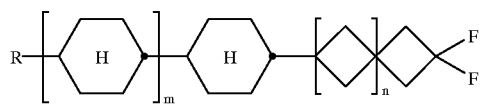

in which,
R is H, an alkyl or alkenyl radical having 1 or 2 to 15 carbon atoms respectively which is unsubstituted, monosubstituted by CN or $CF_3$ or at least monosubstituted by halogen, where one or more $CH_2$ groups in these radicals may also, in each case independently of one another, be replaced by —O—, —S—, -◇-, —CO—, —CO—O—, —O—CO— or —O—CO—O— in such a way that O atoms are not linked directly to one another, m is 0 or 1,
n is 0, 1 or 2, preferably 0 or 1, and
m+n is 1, 2 or 3, preferably 1 or 2.

Preferably, m=1 and n=0 or 1, particularly preferably m=1 and n=0.

The compounds of the formula I have a broad range of applications. Depending on the choice of substituents, these compounds can serve as base materials of which liquid-crystalline media are predominantly composed; however, it is also possible to add compounds of the formula I to liquid-crystalline base materials from other classes of compound in order, for example, to modify the dielectric and/or, in particular, the optical anisotropy of a dielectric of this type and/or to optimize its threshold voltage and/or optionally its viscosity.

In the pure state, the compounds of the formula I are colourless and form liquid-crystalline mesophases in a temperature range which is favourably located for electro-optical use. They are stable chemically, thermally and to light.

Ketones of the formula:

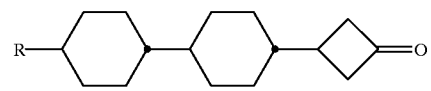

from which compounds of the formula I can be prepared, are disclosed in E. Poetsch et al.; 14th Internat. Liquid Crystal Conference, Jun. 21–26, 1992, Pisa, Poster Section A, and 15th Internat. Liquid Crystal Conference, Jul. 3–8, 1994, Lecture Series B.

Preference is given to media according to the invention comprising compounds of the formula I in which m is 1 and n is 0 or 1.

Particular preference is given to media comprising compounds of the formula I in which m is 1 and n is 0.

If R is an alkyl radical and/or an alkoxy radical, this can be straight-chain or branched. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If R is an alkyl radical in which one $CH_2$ group has been replaced by —CH=CH—, this can be straight-chain or branched. It is preferably straight-chain and has 2 to 10 carbon atoms. Accordingly, it is in particular vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- -7-enyl, non-1-, -2-, -3-, -4-, -5-, -6-, -7- or -8-enyl, or dec-1-, -2-, -3-, -4-, -5-, -6-, -7-, -8- or -9-enyl.

If R is an alkyl radical in which one $CH_2$ group has been replaced by —O— and one has been replaced by —CO—, these are preferably adjacent. These thus contain an acyloxy group —CO—O— or an oxycarbonyl group —O—CO—. These are preferably straight-chain and have 2 to 6 carbon atoms.

They are accordingly in particular acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If R is an alkyl radical in which one $CH_2$ group has been replaced by unsubstituted or substituted —CH=CH— and an adjacent $CH_2$ group has been replaced by CO or CO—O or O—CO, this can be straight-chain or branched. It is preferably straight-chain and has 4 to 13 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl 7-methacryloyloxyheptyl, 8-methacryloyloxyoctyl or 9-methacryloyloxynonyl.

If R is an alkyl or alkenyl radical which is monosubstituted by CN or $CF_3$, this radical is preferably straight-chain. The substitution by CN or $CF_3$ is in any desired position.

If R is an at least mono-halogen-substituted alkyl or alkenyl radical, this radical is preferably straight-chain and halogen is preferably F or Cl. In the case of multiple substitution, halogen is preferably F. The resultant radicals also include perfluorinated radicals. In the case of monosubstitution, the fluorine or chlorine substituent can be in any desired position, but is preferably in the ω-position.

Compounds of the formula I which contain wing groups R which are suitable for polymerization reactions are suitable for the preparation of the liquid-crystalline polymers.

Compounds of the formula I containing branched wing groups R may occasionally be of importance owing to better solubility in the conventional liquid-crystalline base materials, but in particular as chiral dopants if they are optically active. Smectic compounds of this type are suitable as components of ferro-electric materials.

Compounds of the formula I having $S_A$ phases are suitable, for example, for thermally addressed displays.

Branched groups generally contain not more than one chain branch. Preferred branched radicals R are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy or 1-methylheptoxy.

If R is an alkyl radical in which two or more $CH_2$ groups have been replaced by —O— and/or —CO—O—, this can be straight-chain or branched. It is preferably branched and has 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxycarbonyl)hexyl.

Particular preference is given to compounds of the formula I in which m=1 and n 0, and R is methyl, ethyl, propyl, butyl, pentyl, vinyl, 1E-propenyl, 1E-butenyl or 1E-pentenyl, and to media comprising these compounds. Of these compounds, particular preference is given to the alkyl compounds.

The compounds of the formula I can be prepared by known methods using known fluorine transfer agents, such as diethylaminosulphur trifluoride (DAST) or $SF_4$, from the precursor ketones Ia, which are already known (E. Poetsch et al.; 14th Internat. Liquid Crystal Conference, Jun. 21–26, 1992, Pisa, Poster Section A, and 15th Internat. Liquid Crystal Conference, Jul. 3–8, 1994, Lecture Series B), in accordance with the following reaction scheme:

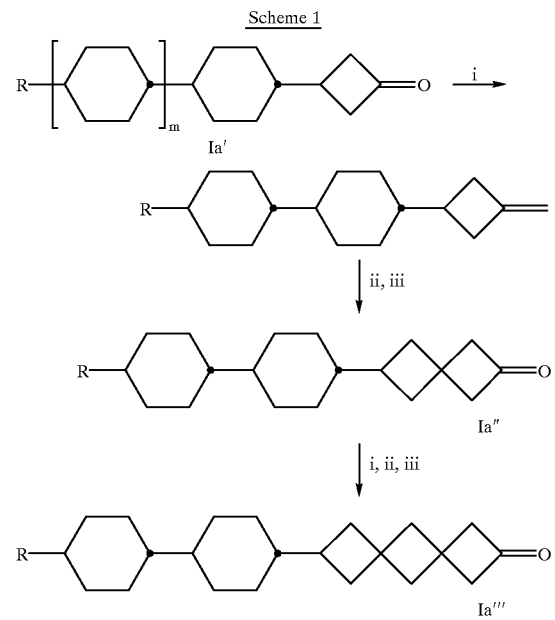

i: Wittig, ii: $CCl_3COCl$/Zn; iii: Zn/HOAc

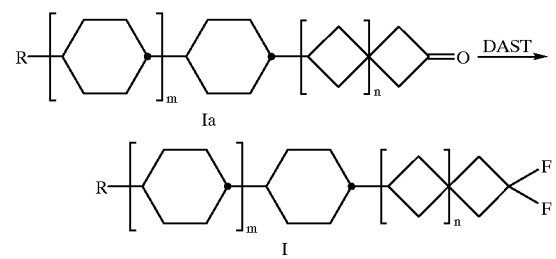

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which comprise media of this type, and to the use of these media for electro-optical purposes. The liquid-crystal mixtures according to the invention allow a significant increase in the parameter latitude which is available.

The achievable combinations of clearing point, viscosity at low temperature, thermal and UV stability, optical anisotropy (i.e. birefringence) and threshold voltage are far superior to the known materials from the prior art.

The requirement for a high clearing point, nematic phase at low temperature and low birefringence (Δn) and simultaneously a low threshold voltage has hitherto only been achieved inadequately. Although liquid-crystal mixtures such as, for example, MLC-6476 and MLC-6625 (Merck KGaA, Darmstadt, Germany) have comparable clearing points and low-temperature stabilities, they both have, however, much higher Δn values of about 0.075 and much higher threshold voltages of about 1.7 V or more.

While retaining the nematic phase down to −20° C., preferably down to −30° C., particularly preferably down to −40° C., and clearing points above 80° C., preferably above 90° C., particularly preferably above 100° C., the liquid-crystal mixtures according to the invention simultaneously allow birefringence values of ≦0.07, preferably ≦0.065, particularly preferably ≦0.0635, especially ≦0.0625, very particularly preferably ≦0.0615, and a low threshold voltage, allowing excellent STN and MLC displays, in particular reflective MLC displays, to be achieved. In particular, the mixtures are characterized by low operating voltages. The TN thresholds are below 1.5 V, preferably below 1.4 V, particularly preferably <1.3 V.

The mixtures according to the invention are particularly preferably characterized by a clearing point of 80° C. or above and a threshold voltage of 1.40 V or below and a Δn of 0.0625 or below, preferably:

a threshold voltage of 1.35 V or below and a Δn of 0.0615 or below, or a threshold voltage of 1.30 or below and a Δn of 0.064 or below, preferably 0.063 or below.

It is evident to the person skilled in the art that a suitable choice of the components of the mixtures according to the invention also allows higher clearing points (for example above 110° C.) to be achieved at the same time as lower dielectric anisotropy values and thus higher threshold voltages, or lower clearing points to be achieved at the same time as higher dielectric anisotropy values (for example >12) and thus lower threshold voltages (for example <1.1 V) while retaining the other advantageous properties. Likewise, mixtures of higher Δε and thus lower thresholds can also be obtained at viscosities which are increased correspondingly little. The MLC displays according to the invention preferably operate at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584, 1975], where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. Thus, significantly higher specific resistance values can be achieved using the mixtures according to the invention at the first minimum than in the case of mixtures comprising cyano compounds. Through a suitable choice of the individual components and their proportions by weight, the person skilled in the art can set the birefringence necessary for a specified layer thickness of the MLC display using simple routine methods. The requirements of reflective MLC displays are described, for example, in Digest of Technical Papers, SID Symposium 1998.

The rotational viscosity $\gamma_1$ at 20° C. is preferably <140 mPa.s, particularly preferably <120 mPa.s. The nematic phase range is preferably at least 90° C., in particular at least 100° C. This range preferably extends from at least −20° C. to +80° C.

Measurements of the capacity holding ratio, also known as the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I have an adequate HR for MLC displays.

The media according to the invention preferably comprise a plurality (preferably two or more) of compounds of the formula I, i.e. the proportion of these compounds is 5–95%, preferably 10–60%, particularly preferably in the range 15–50%.

The individual compounds of the formulae II to X and their subformulae which can be used in the media according to the invention are either known or can be prepared analogously to the known compounds.

Preferred embodiments are indicated below.

a) the medium additionally comprises one or more compounds selected from the group consisting of the general formulae II to VIII:

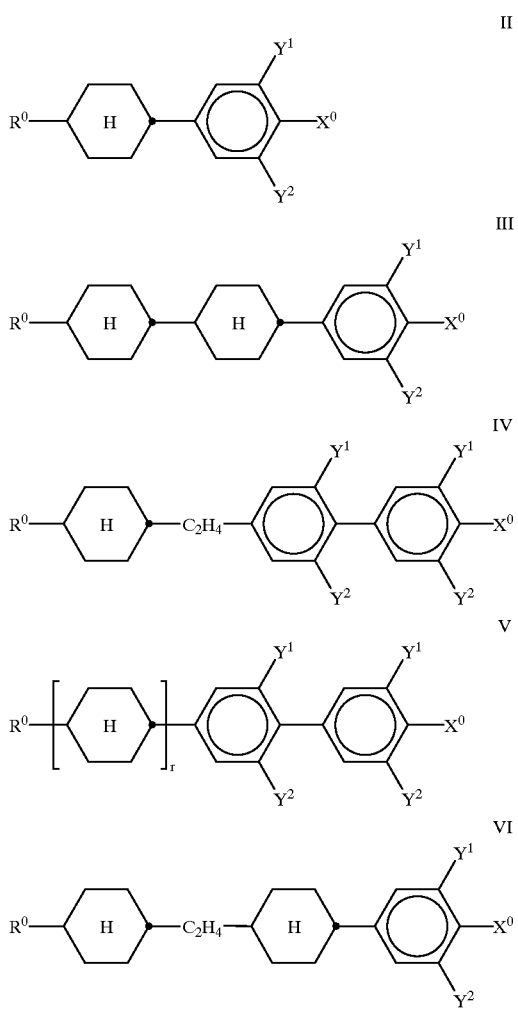

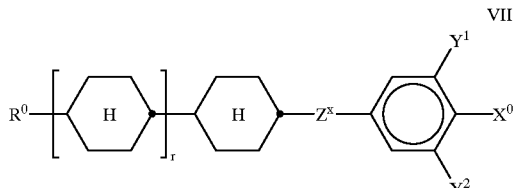

VII

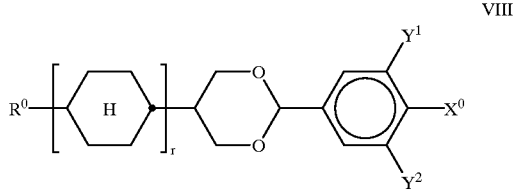

VIII in which the individual radicals have the following meanings:

R⁰: n-alkyl, oxaalkyl, fluoroalkyl or alkenyl, in each case having 1 or 2 to 7 carbon atoms, X⁰: F, Cl, halogenated alkyl, alkenyl or alkoxy having 1 or 2 to 6 carbon atoms, $Z^x$: $CH_2CH_2$ or COO, $Y^1$ and $Y^2$: each, independently of one another, H or F, and r: 0 or 1.

The compound of the formula V is preferably a compound selected from the group of compounds of the formulae Va to Vd:

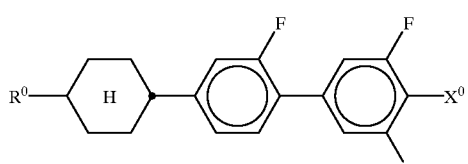

Va

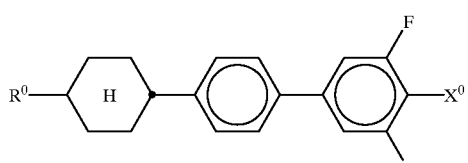

Vb

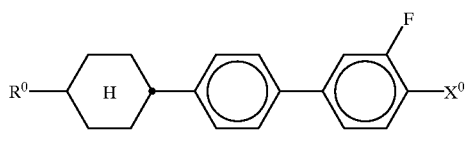

Vc

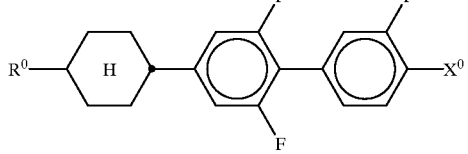

Vd

Preferably, at least one compound of the formula II is employed. This is particularly preferably a compound of the formula IIIa:

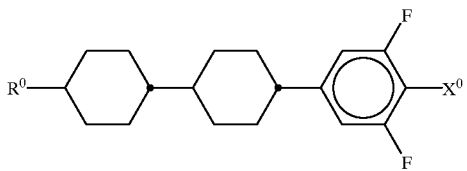

IIIa in which R⁰ is as defined above for the formula III, and X⁰ is F, $OCHF_2$ or $OCF_3$, but R⁰ is preferably n-alkyl and particularly preferably N-alkyl having 2 to 5 carbon atoms, and X⁰ is preferably F.

It is very particularly preferred to employ one or more compounds of the formula IIa where X⁰=F.

b) The medium additionally comprises one or more compounds selected from the group consisting of the compounds of the general formulae VII and VIII:

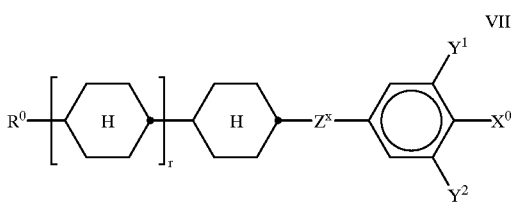

VII

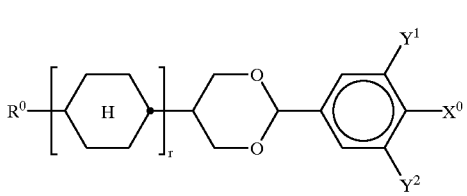

VIII in which R , $Y^1$, X⁰, $Y^2$ and r are as defined above for the formulae VII and VIII, and $Y^1$ and $Y^2$ are preferably F, n is preferably 1 and X⁰ is preferably F.

Particular preference is given to compounds of the formulae VIIa and VIIIa:

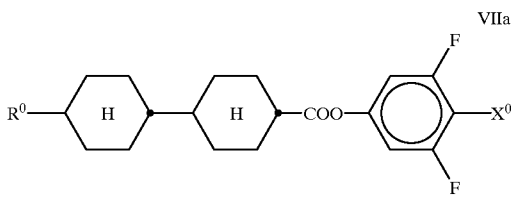

VIIa

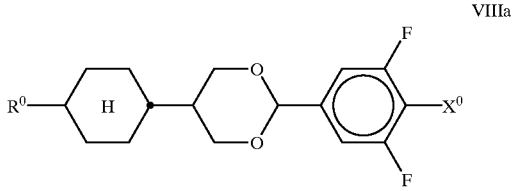

VIIIa in which R⁰ is as defined above for the formulae II to VII, and X⁰ is F, $OCF_3$ or $CCHF_2$, preferably F.

In which R⁰, X⁰, $Y^1$ and $Y^2$ are each, independently of one another, as defined above for the formulae II to VII, preferably F, Cl, $CF_3$, $OCF_3$, $OCHF_2$, alkyl, oxaalkyl, fluoroalkyl or alkenyl, each having up to 6 carbon atoms.

c) The medium additionally comprises one or more compounds of the general formula IX:

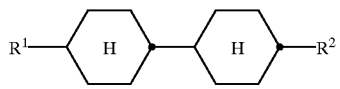

IX in which,

R$^1$ and R$^2$, independently of one another, are alkyl, alkoxy having 1 to 7 carbon atoms, alkenyl, alkenyloxy or alkoxyalkyl having 2 to 7 carbon atoms, or fluoroalkyl.

The medium particularly preferably comprises one or more compounds of the formulae IXa and/or IXb:

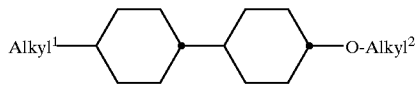

IXa

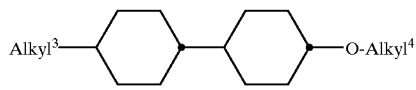

IXb in which, in each case independently of one another,

Alkyl$^1$ is n-alkyl having 1 to 7 carbon atoms, preferably having 1 to 5 carbon atoms, Alkyl$^2$ is n-alkyl having 1 to 5 carbon atoms, preferably 1, 2 or 3 carbon atoms, particularly preferably 1 carbon atom, Alkyl$^3$ is n-alkyl having 1 to 7 carbon atoms, preferably having 1 to 5 carbon atoms, Alkyl$^4$ is n-alkyl having 1 to 5 carbon atoms, preferably having 2 to 4 carbon atoms, particularly preferably 3 carbon atoms.

d) The medium additionally comprises one or more compounds of the general formula X:

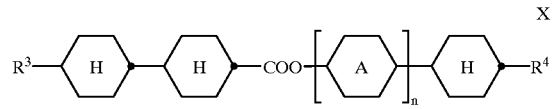

X in which,

R$^3$ and R$^4$, independently of one another, are as defined above for R$^1$ and R$^2$ for the formula IX, and R$^3$ and R$^4$ are each preferably, independently of one another, n-alkyl having 1 to 7 carbon atoms, particularly preferably having 3 to 5 carbon atoms,

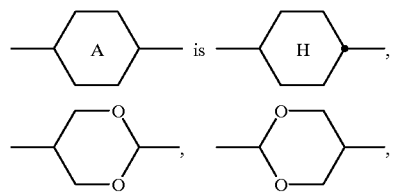

-continued

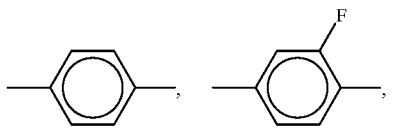

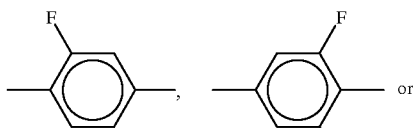

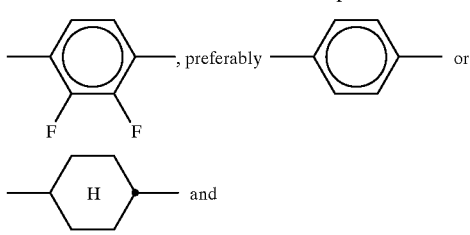

n is 0 or 1.

Particular preference is given to the use of the compounds of the formulae Xa and/or Xb:

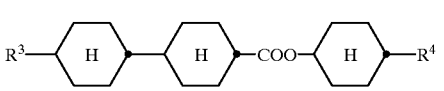

Xa

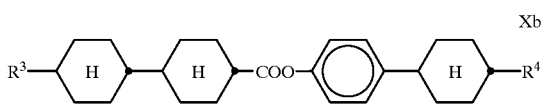

Xb in which,

R$^3$ and R$^4$ are each, independently of one another, n-alkyl having 1 to 7 carbon atoms, preferably having 3 to 5 carbon atoms.

e) The proportion of compounds of the formula I in the mixture as a whole is at least 5%, preferably 7–40%, particularly preferably 10–20%.

f) The proportion of compounds of the formulae II to VII in the mixture as a whole is 10–30%, preferably 5–20%, particularly preferably 10–15%. These limits apply in particular to the compound of the formula IIa.

g) The proportion of compounds of the formulae VII and VIII, especially of the compounds VIIa and VIIIa, in the mixture as a whole is 30–70%, preferably 40–60%, particularly preferably 45–55%.

h) The proportion of compounds of the formula VII is 10–35%, preferably 20–30%.

i) The proportion of compounds of the formula VIII in the mixture as a whole is 10–40%, preferably 18–30%.

j) The proportion of compounds of the formula IX in the mixture as a whole is 0–24%, preferably 5–20%, particularly preferably 7 to 15%.

k) The proportion of compounds of the formula X in the mixture as a whole is 0–30%, preferably 5–20%, particularly preferably 10–16%.

1)

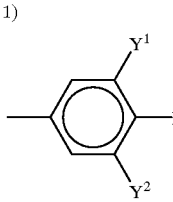

-continued

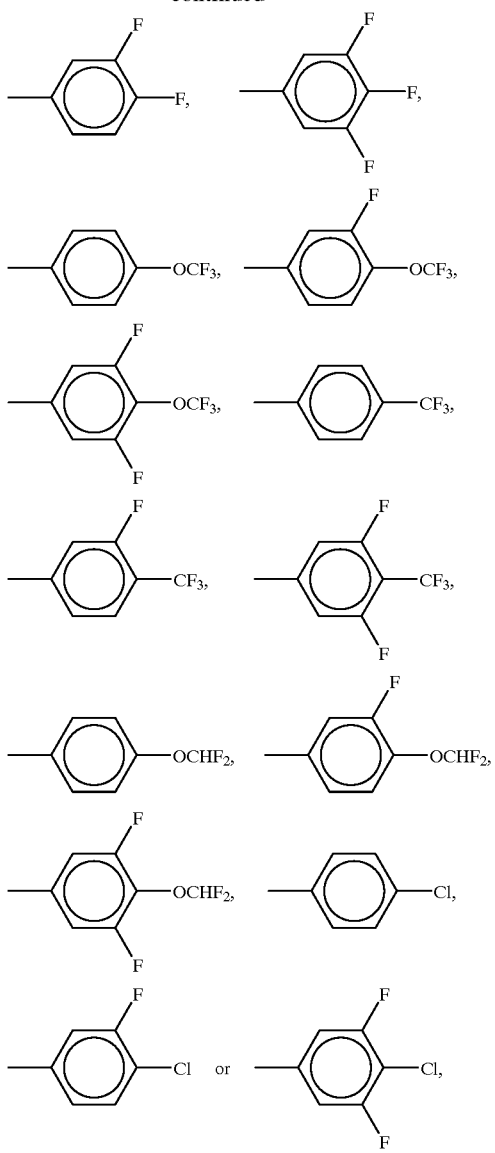

particularly preferably

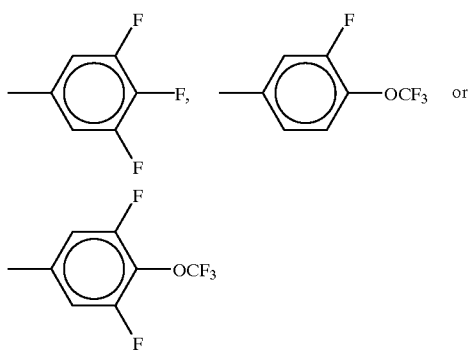

m) The medium comprises compounds of the formulae II, VII, IX, X and XI.

n) $R^0$ is preferably straight-chain alkyl or alkenyl having 2 to 7 carbon atoms.

o) The medium essentially consists of compounds of the formulae I to X, where "essentially" in this application denotes to the extent of more than 50%, preferably at least 70%, particularly preferably at least 80%.

p) The medium essentially consists of compounds of the formulae I to IX.

q) The medium comprises further compounds, preferably selected from the following group consisting of the general formulae IXa, IXb, Xa and Xb.

r) The medium comprises further compounds, preferably of the general formula IXc:

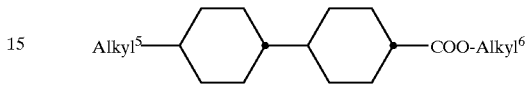

IXc in which,

Alkyl$^5$ is n-alkyl having 1 to 7 carbon atoms, preferably having 3 to 5 carbon atoms, and Alkyl$^6$ is n-alkyl having 1 to 5 carbon atoms, preferably having 1 to 3 carbon atoms.

s) The (I):(II+VII+VIII+IX+X) weight ratio is preferably 1:10 to 1:1.5, particularly preferably from 1:8 to 1:3.

t) The medium essentially consists of compounds selected from the group consisting of the general formulae I, Ia, VIIa, VIIIa, IXa, Xa and Xb.

u) The medium comprises compounds of the formulae I, II, VII, VIII, IX and X and preferably essentially consists of these compounds.

It has been found that even a relatively small proportion of compounds of the formula I mixed with conventional liquid-crystal materials, but in particular with one or more compounds of the formulae II, VIII, IX and/or X, results in a significant reduction in the birefringence values and in low threshold voltages, where broad nematic phases with low smectic-nematic transition temperatures are simultaneously observed, improving the storage stability.

The term "alkyl" preferably covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" preferably covers straight-chain and branched alkenyl groups having 2–7 carbon atoms, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. n is preferably 1 and m is preferably from 1 to 6.

Through suitable choice of the meanings of $R^0$, $R^{0'}$, $R^{0''}$, $X^0$ and $X^{0'}$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in short addressing times, improved nematic tendencies and a higher ratio of the elastic constants $k_{33}$ (bend) and $k_{11}$ (splay) compared with alkyl or alkoxy radicals. 4-Alkenyl radicals, 3-alkenyl radicals and the like generally give lower threshold voltages and smaller values of $k_{33}/k_{11}$ compared with alkyl and alkoxy radicals.

A —$CH_2CH_2$— group generally results in higher values of $k_{33}/k_{11}$ compared with a single covalent bond. Higher values of $k_{33/k11}$ facilitate, for example, flatter transmission characteristic lines in TN cells with a 90° twist (in order to achieve grey shades) and steeper transmission characteristic lines in STN, SBE and OMI cells (higher multiplexability), and vice versa.

The optimum mixing ratio of the compounds of the formulae I and II+III IV+V+VI+VIII+IX depends substantially on the desired properties, on the choice of the components of the formulae I, II, III, IV, V, VI, VII and/or VIII, and on the choice of any other components which may be present. Suitable mixing ratios within the range given above can easily be determined from case to case.

The total amount of compounds of the formulae I to X in the mixtures according to the invention is not crucial. The mixtures can therefore comprise one or more further components in order to optimize various properties. However, the observed effect on the addressing times and the threshold voltage is generally greater the higher the total concentration of compounds of the formulae I to X.

In a particularly preferred embodiment, the media according to the invention comprise compounds of the formulae II to VII in which $X^0$ is F, $OCF_3$ or $OCHF_2$. A favourable synergistic effect with the compounds of the formula I results in particularly advantageous properties. In particular, mixtures comprising compounds of the formula I and the formula IIa are distinguished by their low threshold voltages and their low birefringence.

Mixtures which, besides compounds of the formula I and/or formula IIa, comprise compounds of the formula VII, in particular VIIa, or of the formula VIII, in particular of the formula VIIIa, very particularly of the formula VIIa and of the formula VIIIa, are distinguished by good threshold voltages.

The construction of the STN or MLC display according to the invention from polarizers, electrode base plates and surface-treated electrodes corresponds to the conventional construction for displays of this type. The term "conventional construction" is broadly drawn here and also covers all derivatives and modifications of the MLC display, in particular including matrix display elements based on poly-Si TFT or MIM and very particularly reflective displays.

A significant difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in a lesser amount is dissolved in the components making up the principal constituent, expediently at elevated temperature. It is also possible to prepare the mixtures in other conventional manners, for example by using premixtures, for example homologue mixtures, or by using so-called multi-bottle systems.

The dielectrics may also comprise further additives known to the person skilled in the art and described in the literature. For example, 0–15%, preferably 0–10%, of pleochroic dyes and/or chiral dopants can be added. The individual compounds added are employed in concentrations of from 0.01 to 6%, preferably from 0.1 to 3%. However, the concentration data for the other constituents of the liquid-crystal mixtures, i.e. of the liquid-crystalline or mesogenic compounds, are given without taking into account the concentration of these additives.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The coding in Table B is self-evident. In Table A, only the acronym for the parent structure is given, followed, separated from the acronym for the parent structure by a hyphen, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nN.F.F | $C_nH_{2n+1}$ | CN | F | F |
| $nCF_3$ | $C_nH_{2n+1}$ | $CF_3$ | H | H |
| $nOCF_3$ | $C_nH_{2n+1}$ | $OCF_3$ | H | H |
| $nOCF_3$.F | $C_nH_{2n+1}$ | $OCF_3$ | F | H |
| $nOCF_3$.F.F | $C_nH_{2n+1}$ | $OCF_3$ | F | F |
| $nOCF_2$ | $C_nH_{2n+1}$ | $OCHF_2$ | H | H |
| $nOCF_2$.F.F | $C_nH_{2n+1}$ | $OCHF_2$ | F | F |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |
| $nOCCF_2$.F.F | $C_nH_{2n+1}$ | $OCH_2CF_2H$ | F | F |

Preferred mixture components are shown in Tables A and B.

The mixtures according to the invention preferably comprise at least one of the compounds of the formulae given in Table B.

TABLE A

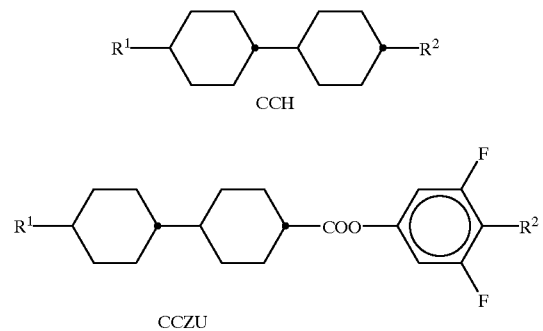

CCH

CCZU

TABLE A-continued

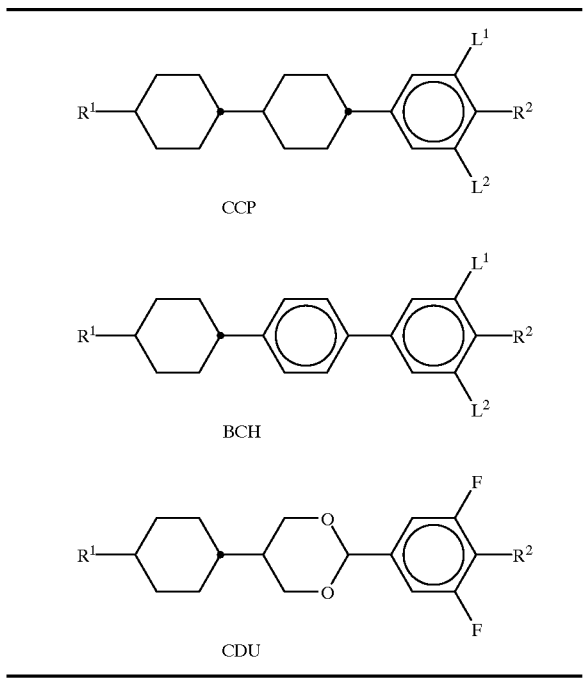

TABLE B

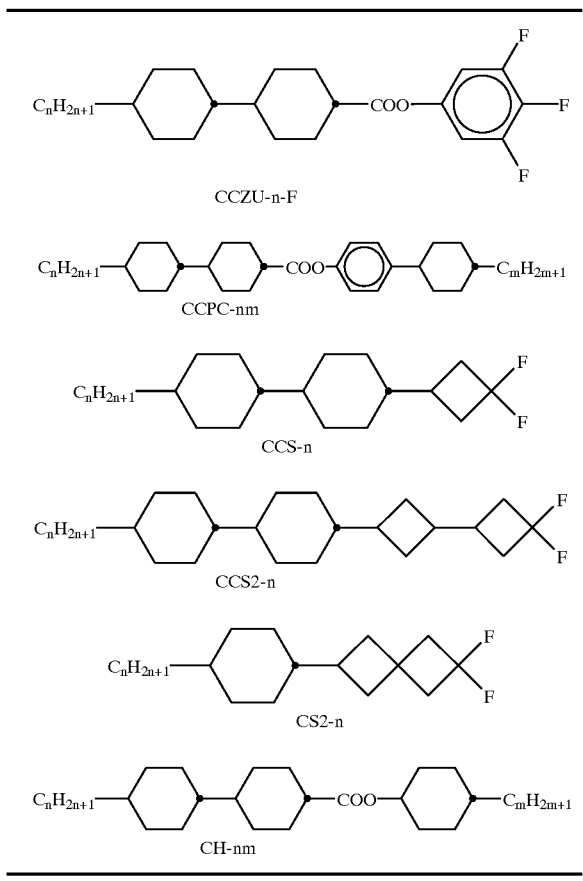

The examples below are intended to illustrate the invention without representing a limitation. All temperatures are given in degrees Celsius. m.p. denotes melting point, cl.p. clearing point. An denotes the optical anisotropy (589 nm, 20° C.), Δε the dielectric anisotropy (1 kHz, 20° C.), and the viscosity $\gamma_1$ (mPa.s) was determined at 20° C.

The physical properties of the liquid-crystal mixtures were determined as described in "Physical Properties of Liquid Crystals", Ed. M. Becker, Merck KGAA, status November 1997, unless explicitly stated otherwise.

C denotes a crystalline phase, S a smectic phase, $S_C$ a smectic C phase, $S_B$ a smectic B phase, N a nematic phase and I the isotropic phase.

$V_{10}$ denotes the voltage for 10% relative contrast (viewing direction perpendicular to the plate surface). ton denotes the switch-on time and $t_{off}$ the switch-off time at a given operating voltage. An denotes the optical anisotropy, and $n_o$ the ordinary refractive index, in each case at 589 nm, unless stated otherwise. Δε denotes the dielectric anisotropy (Δε=$\epsilon_\parallel$-$\epsilon_z$, where $\epsilon_\parallel$ denotes the dielectric constant parallel to the longitudinal axis of the molecules, and $\epsilon_z$ denotes the dielectric constant perpendicular thereto). An is determined at 589 nm and 20° C., and Δε at 1 kHz and 20° C., unless expressly stated otherwise. The electro-optical data were measured in a TN cell (twist 90°, pitch 1°) at the 1st minimum (i.e. at a d·Δn value of 0.5 μm) at 20° C., unless expressly stated otherwise. All physical properties relate to 20° C. and were measured at 20° C., unless expressly stated otherwise. All concentration data, above and below, are given in % by weight, unless expressly stated otherwise.

The examples below are intended to illustrate the invention without representing a limitation. Above and below, percentages are percentages by weight.

"Conventional work-up" means that water is added, the mixture is extracted with dichloromethane, diethyl ether, methyl tert-butyl ether or toluene, the extract is washed with aqueous $NaHCO_3$ solution, the phases are separated, the organic phase is dried and evaporated, and the product is purified by distillation under reduced pressure or crystallization and/or chromatography.

EXAMPLE 1

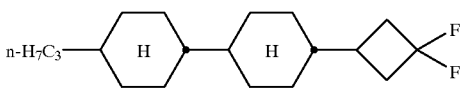

10.71 g (0.038 mol) of ketone Ia' (R=$C_3H_7$, m=1) are introduced into 10 ml of dichloromethane at room temperature. 10 ml (0.076 mol) of diethylaminosulphur trifluoride are then added dropwise at 0° C. with stirring. No exothermicity is observed. However, the white suspension becomes yellow. When the addition is complete, the cooling is removed and stirring is continued overnight at room temperature. The reaction mixture is then stirred into 200 ml of water, and 150 ml of dichloromethane are added. Conventional work-up gives 2.4 g of 99.6% pure material, which was isolated by crystallization from 6.1 g of chromatographically purified product (separation via silica gel and petroleum ether, 40–80° C.).

The phase sequence of the substance is C 54 $S_B$ 92 I.
The following compounds of the formula:

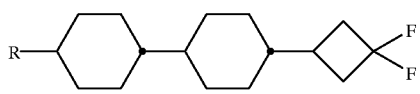

were prepared analogously:

| R | Phase sequence T/° C. |
|---|---|
| $CH_3$ | |
| $C_2H_5$ | C 63 $S_B$ 81 I |
| n-$C_4H_9$ | |
| n-$C_5H_{11}$ | C 45 $S_B$ 89 I |
| n-$C_6H_{13}$ | |
| n-$C_7H_{15}$ | |
| n-$C_8H_{17}$ | |
| n-$C_9H_{19}$ | |
| Vinyl | |
| IE-Propenyl | |

EXAMPLE 2

The compounds of the formula:

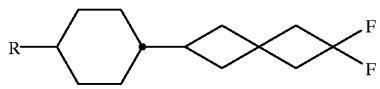

were prepared analogously:

| R | Extrapolated clearing point/° C. (from 10% in ZLI-4792) |
|---|---|
| $CH_3$ | |
| $C_2H_5$ | |
| n-$C_3H_7$ | −108.2 |
| n-$C_4H_9$ | |
| n-$C_5H_{11}$ | |
| n-$C_6H_{13}$ | |
| n-$C_7H_{15}$ | |
| Vinyl | |
| IE-Propenyl | |

EXAMPLE 3

The compounds of the formula:

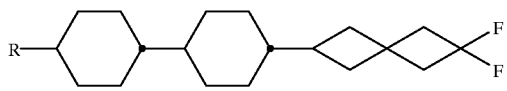

were prepared analogously:

| R | Extrapolated clearing point/° C. (from 10% in ZLI-4792) |
|---|---|
| $CH_3$ | |
| $C_2H_5$ | |
| n-$C_3H_7$ | 94.8 |
| n-$C_4H_9$ | |
| n-$C_5H_{11}$ | |
| n-$C_6H_{13}$ | |
| n-$C_7H_{15}$ | |
| Vinyl | |
| IE-Propenyl | |

MIXTURE EXAMPLES

EXAMPLE 4

| Abbreviation | % by wt. | | |
|---|---|---|---|
| CCH-501 | 7.0 | Clearing point T (N, I)/° C.: | 81 |
| CH-33 | 4.0 | T (S, N)/° C.: | <−30 |
| CH-35 | 4.0 | Δn [589 nm, 20° C.]: | 0.0624 |
| CH-43 | 4.0 | $n_o$ [589 nm, 20° C.]: | 1.4698 |
| CCP-2F.F.F | 12.0 | Δε [1 kHz, 20° C.]: | 9.5 |
| CCZU-2-F | 6.0 | $ε_z$ [1 kHz, 20° C.]: | 4.8 |
| CCZU-3-F | 16.0 | $γ_1$ [20° C.]/mPa · s: | 180 |
| CCZU-5-F | 6.0 | $V_{10}$ [0°, 20° C.]/V: | 1.26 |
| CDU-2-F | 9.0 | | |
| CDU-3-F | 11.0 | | |
| CDU-5-F | 6.0 | | |
| CCS-3 | 8.0 | | |
| CCS-5 | 7.0 | | |
| Σ | 100.0 | | |

EXAMPLE 5

| Abbreviation | % by wt. | | |
|---|---|---|---|
| CCH-501 | 12.0 | Clearing point T (N, I)/° C.: | 81.5 |
| CH-33 | 4.0 | T (S, N)/° C.: | <−20 |
| CH-35 | 4.0 | Δn [589 nm, 20° C.]: | 0.0612 |
| CH-43 | 4.0 | $V_{10}$ [0°, 20° C.]/V: | 1.34 |
| CCP-2F.F.F | 12.0 | | |
| CCZU-2-F | 6.0 | | |
| CCZU-3-F | 16.0 | | |
| CCZU-5-F | 6.0 | | |
| CDU-2-F | 9.0 | | |
| CDU-3-F | 11.0 | | |
| CCS-3 | 8.0 | | |
| CCS-5 | 7.0 | | |
| CCPC-34 | 1.0 | | |
| Σ | 100.0 | | |

EXAMPLE 6

| Abbreviation | % by wt. | | |
|---|---|---|---|
| CH-33 | 4.0 | Clearing point/° C.: | +84.0 |
| CH-35 | 4.0 | Δn [589 nm, 20° C.]: | +0.0612 |
| CH-43 | 4.0 | $n_o$ [589 nm, 20° C.]: | 1.4694 |
| CCH-34 | 3.0 | $V_{10}$ [0°, 20° C.]/V: | 1.31 |
| CCP-2F.F.F | 9.0 | | |
| CCZU-2-F | 6.0 | | |
| CCZU-3-F | 16.0 | | |
| CCZU-5-F | 6.0 | | |

-continued

| Abbreviation | % by wt. | | |
|---|---|---|---|
| CDU-2-F | 9.0 | | |
| CDU-3-F | 11.0 | | |
| CDU-5-F | 8.0 | | |
| CCS-3 | 10.0 | | |
| CCS-5 | 10.0 | | |
| Σ | 100.0 | | |

EXAMPLE 7

| Abbreviation | % by wt. | | |
|---|---|---|---|
| CCH-501 | 7.0 | Clearing point/° C.: | +81.0 |
| CH-33 | 4.0 | T (S, N)/° C.: | <−30 |
| CH-35 | 4.0 | Δn [589 nm, 20° C.]: | +0.0624 |
| CH-43 | 4.0 | $n_o$ [589 nm, 20° C.]: | 1.4698 |
| CCP-2F.F.F | 12.0 | Δε [1 kHz, 20° C.]: | +9.5 |
| CCZU-2-F | 6.0 | $\varepsilon_\perp$ [1 kHz, 20° C.]: | 4.8 |
| CCZU-3-F | 16.0 | $\gamma_1$ [20° C.]/mPa·s: | 180 |
| CCZU-5-F | 6.0 | $V_{10}$ [0°, 20° C.]/V: | 1.26 |
| CDU-2-F | 9.0 | | |
| CDU-3-F | 11.0 | | |
| CDU-5-F | 6.0 | | |
| CCS-3 | 8.0 | | |
| CCS-5 | 7.0 | | |
| Σ | 100.0 | | |

EXAMPLE 8

| Abbreviation | % by wt. | | |
|---|---|---|---|
| CCH-501 | 12.0 | Clearing point/° C.: | +81.5 |
| CH-33 | 4.0 | T (S, N)/° C.: | <−20 |
| CH-35 | 4.0 | Δn [589 nm, 20° C.]: | +0.0612 |
| CH-43 | 4.0 | $n_o$ [589 nm, 20° C.]: | 1.4700 |
| CCP-2F.F.F | 12.0 | $V_{10}$ [0°, 20° C.]/V: | 1.34 |
| CCZU-2-F | 6.0 | | |
| CCZU-3-F | 16.0 | | |
| CCZU-5-F | 6.0 | | |
| CDU-2-F | 9.0 | | |
| CDU-3-F | 11.0 | | |
| CCS-3 | 8.0 | | |
| CCS-5 | 7.0 | | |
| CCPC-34 | 1.0 | | |
| Σ | 100.0 | | |

EXAMPLE 9

| Abbreviation | % by wt. | | |
|---|---|---|---|
| CC-5-V | 5.0 | Clearing point/° C.: | +86.5 |
| CCH-501 | 10.0 | Δn [589 nm, 20° C.]: | +0.0620 |
| CH-33 | 4.0 | $n_o$ [589 nm, 20° C.): | 1.4700 |
| CH-35 | 4.0 | $V_{10}$ [0°, 20° C.]/V: | 1.64 |
| CH-43 | 4.0 | | |
| CCP-2F.F.F | 11.0 | | |
| CCP-3F.F.F | 11.0 | | |
| CCP-5F.F.F | 6.0 | | |
| CCZU-2-F | 6.0 | | |
| CCZU-3-F | 16.0 | | |
| CCZU-5-F | 6.0 | | |

-continued

| Abbreviation | % by wt. |
|---|---|
| CCS-2 | 5.0 |
| CCS-3 | 6.0 |
| CCS-5 | 6.0 |
| Σ | 100.0 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosure of all applications, patents and publications, cited above, are hereby incorporated by reference.

This application claims priority under 35 USC Section 119 to German Patent Application 19844498.2, filed Sep. 29, 1998, which application is expressly incorporated herein by reference.

Not intending to be limited by the specific examples and preferred embodiments discussed hereinbefore, but only by the claims which follow, the applicants claim:

1. Liquid-crystalline medium based on a mixture of polar compounds of positive dielectric anisotropy, characterized in that it comprises one or more compounds of general formula I:

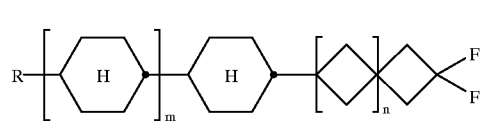

in which,

R is H, an alkyl or alkenyl radical having 1 or 2 to 15 carbon atoms respectively which is unsubstituted, monosubstituted by CN or $CF_3$ or at least monosubstituted by halogen, where one or more $CH_2$ groups in these radicals may also, in each case independently of one another, be replaced by —O—, —S—,

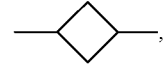

—CO—, —CO—O—, —O—CO— or —O—CO—O— in such a way that O atoms are not linked directly to one another, m is 0 or 1, n is 0, 1 or 2, m+n is 1, 2 or 3.

2. Medium according to claim 1, characterized in that it additionally comprises one or more compounds selected from the group consisting of the general formulae II to VI:

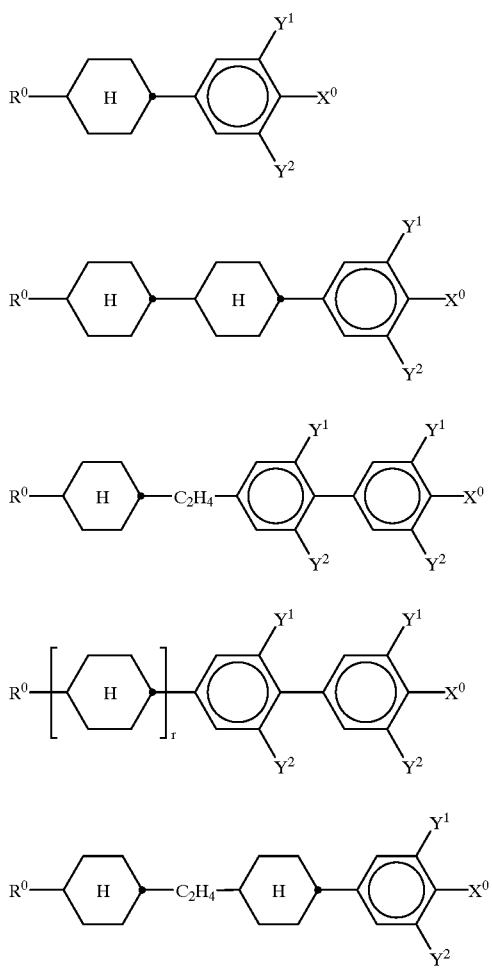

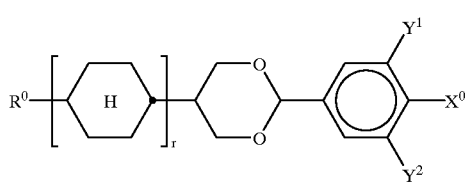

in which,

X⁰: F, Cl, halogenated alkyl, alkenyl or alkoxy having 1 or 2 to 6 carbon atoms, R⁰: n-alkyl, oxyalkyl, fluoroalkyl or alkenyl, in each case having 1 or 2 to 7 carbon atoms, $Y^1$ and $Y^2$: each, independently of one another, H or F, r: 0 or 1, and $Z^x$: is $CH_2CH_2$ or —COO—.

4. Medium according to claim 1, characterized in that the proportion of compounds of the formula I in the mixture as a whole is at least 10% by weight.

5. Medium according to claim 2, characterized in that the proportion of compounds of the formulae II to VI together in the mixture as a whole is from 10 to 30% by weight.

6. Medium according to claim 3, characterized in that it comprises a compound of the formula VII:

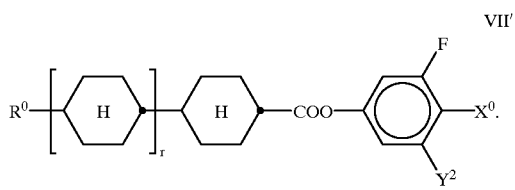

7. Medium according to claim 6, characterized in that $X^0$ is F or $OCF_3$ and $Y^2$ is H or F.

8. Medium according to claim 1, characterized in that it comprises one or more compounds of the formula III:

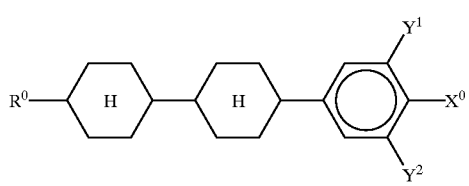

in which, $X^0$ is F, $OCHF_2$ or $OCF_3$, $Y^1$ and $Y^2$ are each, independently of one another, H or F, and $R^0$ is n-alkyl, oxaalkyl or fluoroalkyl, each having up to 7 carbon atoms.

9. Electro-optical liquid-crystal display containing a liquid-crystalline medium according to claim 1.

10. A liquid-crystalline medium having positive dielectric anisotropy, comprising:

in which the individual radicals have the following meanings:

R⁰: n-alkyl, oxaalkyl, fluoroalkyl or alkenyl, each having up to 9 carbon atoms, X⁰: F, Cl, halogenated alkyl, alkenyl or alkoxy having 1 or 2 to 6 carbon atoms, $Y^1$ and $Y^2$: each, independently of one another, H or F, and r: 0 or 1.

3. Medium according to claim 1, characterized in that it additionally comprises one or more compounds selected from the group of the compounds of the formulae VII and VIII:

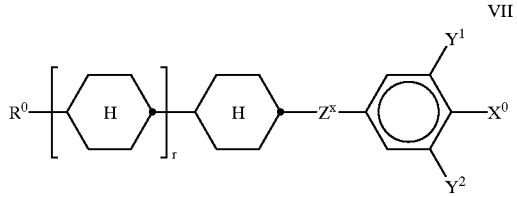

at least one compound of general formula I:

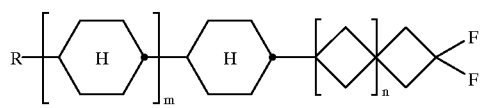

in which,

R is H, an alkyl or alkenyl radical having 1 or 2 to 15 carbon atoms respectively which is unsubstituted, monosubstituted by CN or $CF_3$ or at least monosubstituted by halogen, where one or more $CH_2$ groups in these radicals may also, in each case independently of one another, be replaced by —O—, —S—,

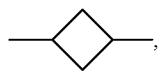

—CO—, —CO—O—, —O—CO—, or —O—CO—O— in such a way that O atoms are not linked directly to one another, m is 0 or 1, n is 0, 1 or 2, and m+n is 1, 2 or 3.

11. A medium according to claim 10, further comprising at least one of the following compounds of formulae II, III, IV, V, or VI:

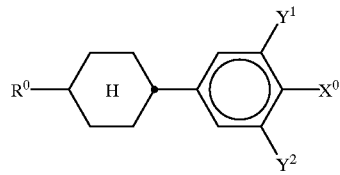

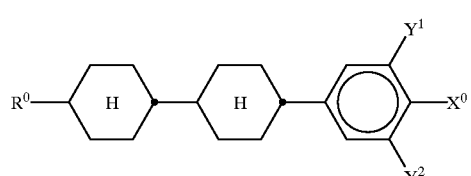

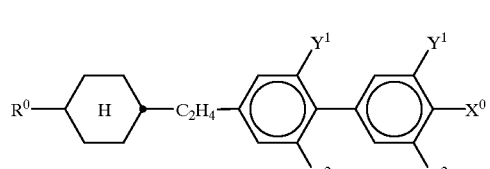

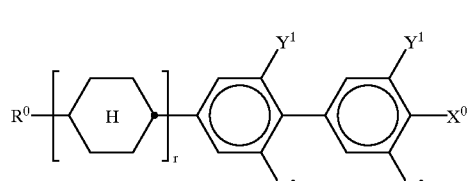

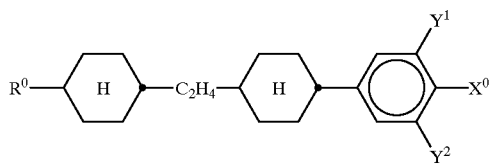

in which the individual radicals have the following meanings:

$R^0$: n-alkyl, oxaalkyl, fluoroalkyl or alkenyl, each having up to 9 carbon atoms, $X^0$: F, Cl, halogenated alkyl, alkenyl or alkoxy having 1 or 2 to 6 carbon atoms, $Y^1$ and $Y^2$: each, independently of one another, H or F, and r: 0 or 1.

12. A medium according to claim 10, further comprising at least one of the following compounds of formulae VII or VIII:

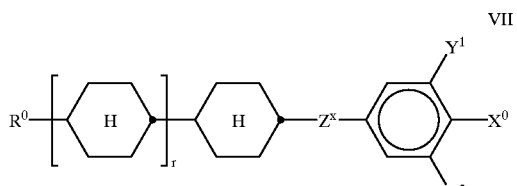

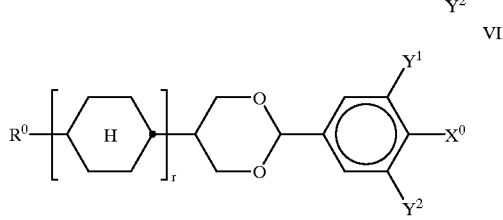

in which the individual radicals have the following meanings:

$R^0$: n-alkyl, oxaalkyl, fluoroalkyl or alkenyl, each having up to 9 carbon atoms, $X^0$: F, Cl, halogenated alkyl, alkenyl or alkoxy having 1 or 2 to 6 carbon atoms, $Y^1$ and $Y^2$: each, independently of one another, H or F, and r: 0 or 1.

13. A medium according to claim 10, wherein there is a mixture of polar compounds present, and the compounds of the formula I in the mixture as a whole is at least 10% by weight.

14. A medium according to claim 11, wherein the compounds form a mixture, and the at least one compound of the formulae II to VI is present in an amount of from 10 to 30% by weight of the total mixture.

15. A medium according to claim 3, wherein, the compound of Formula VII is a compound of the formula VII:

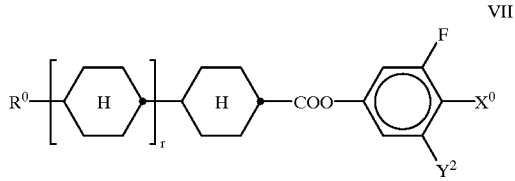

in which,

R⁰: n-alkyl, oxaalkyl, fluoroalkyl or alkenyl, each having up to 9 carbon atoms, X⁰: F, Cl, halogenated alkyl, alkenyl or alkoxy having 1 or 2 to 6 carbon atoms, Y²: H or F, and r: 0 or 1.

16. A medium according to claim 13, wherein X⁰ is F or OCF₃ and Y² is H or F.

17. A medium according to claim 9, further comprising one or more compounds of formula III:

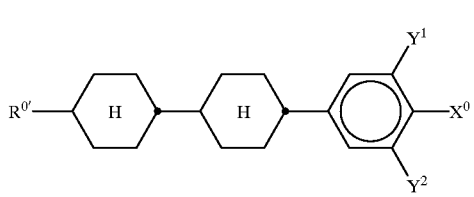

in which,

X⁰ is F, OCHF₂ or OCF₃,

Y¹ and Y² are each, independently of one another, H or F, and

R⁰ is n-alkyl, oxaalkyl or fluoroalkyl, each having up to 7 carbon atoms.

18. A process for altering the optical qualities of a liquid crystalline medium comprising:
    supplying an effective amount of a liquid-crystalline medium according to claim 1, and
    applying an electrical field to the medium to alter its optical qualities.

19. An electro-optical liquid-crystal display, comprising a liquid-crystalline medium according to claim 10.

20. An electro-optical device comprising an electro-optical display containing a medium as claimed in claim 1.

* * * * *